(12) United States Patent
Anderson et al.

(10) Patent No.: US 6,680,749 B1
(45) Date of Patent: Jan. 20, 2004

(54) METHOD AND SYSTEM FOR INTEGRATING AN APPLICATION USER INTERFACE WITH A DIGITAL CAMERA USER INTERFACE

(75) Inventors: Eric C. Anderson, San Jose, CA (US); Steve Saylor, Morgan Hill, CA (US); Amanda R. Mander, Palo Alto, CA (US); Laslo Vespremi, Moss Beach, CA (US)

(73) Assignee: FlashPoint Technology, Inc., Peterborough, NH (US)

( * ) Notice: Subject to any disclaimer, the term of this patent is extended or adjusted under 35 U.S.C. 154(b) by 0 days.

(21) Appl. No.: 08/965,338

(22) Filed: Nov. 6, 1997

(Under 37 CFR 1.47)

Related U.S. Application Data

(63) Continuation-in-part of application No. 08/851,667, filed on May 6, 1997, now Pat. No. 6,118,480.

(51) Int. Cl.⁷ .................................................. H04N 5/76

(52) U.S. Cl. .................................................. 348/231.99

(58) Field of Search ................................ 348/231, 232, 348/233, 239, 333.05–333.12, 552; 345/326, 327, 328, 339, 341, 348, 354, 357, 973; 358/450, 451, 452

(56) References Cited

U.S. PATENT DOCUMENTS

| | | | | |
|---|---|---|---|---|
| 4,827,347 A | * | 5/1989 | Bell | 348/333 |
| 5,425,137 A | * | 6/1995 | Mohan et al. | 345/433 |
| 5,434,958 A | * | 7/1995 | Surma et al. | 395/135 |
| 5,459,830 A | * | 10/1995 | Ohba et al. | 345/473 |
| 5,477,264 A | | 12/1995 | Sarbadhikari et al. | |
| 5,748,326 A | * | 5/1998 | Thompson-Bell et al. | 358/296 |
| 5,831,590 A | * | 11/1998 | Ikedo | 345/113 |
| 5,943,050 A | * | 8/1999 | Bullock et al. | 348/333.01 |
| 5,977,985 A | * | 11/1999 | Ishii et al. | 345/433 |
| 5,978,016 A | * | 11/1999 | Lourette et al. | 348/64 |
| 5,982,350 A | * | 11/1999 | Hekmatpour et al. | 345/113 |
| 6,097,389 A | * | 8/2000 | Morris et al. | 345/348 |
| 6,215,523 B1 | * | 4/2001 | Anderson | 348/333.05 |

* cited by examiner

*Primary Examiner*—Wendy R. Garber
*Assistant Examiner*—Rashawn N. Tillery
(74) *Attorney, Agent, or Firm*—Sawyer Law Group LLP

(57) ABSTRACT

A method and system for providing a user interface for an application program executed in a digital imaging device, wherein the digital imaging device and the application program applies a plurality of imaging effects to captured images. The method and system include selecting one of the captured images, and automatically applying the plurality of effects to the selected image to provide a plurality of preview results. The plurality of preview results are then displayed as an aligned set of application specific items in the display along with the selected image to thereby provide a real-time preview of each type of effect applied to the selected image.

18 Claims, 15 Drawing Sheets

METHOD AND SYSTEM FOR INTEGRATING AN APPLICATION USER INTERFACE WITH A DIGITAL CAMERA USER INTERFACE

CROSS-REFERENCE TO RELATED APPLICATIONS

This is a continuation-in-part of U.S. Ser. No. 08/851,667 filed May 5 1997 now U.S. Pat. No. 6,118,480 issued on Sep. 12, 2000, entitled "Method And Apparatus For Integrating A Digital Camera User Interface Across Multiple Operating Modes."

FIELD OF THE INVENTION

The present invention relates generally to digital imaging devices, and more particularly to a method and system for integrating an application user interface with a digital camera user interface.

BACKGROUND OF THE INVENTION

Most digital cameras today are similar in size to and behave like conventional point-and-shoot cameras. Unlike conventional cameras, however, most digital cameras store digital images in an internal flash memory or on external memory cards, and some are equipped with a liquid-crystal display (LCD) screen on the back of the camera. Through the use of the LCD, most digital cameras operate in two modes, record and play, although some only have a record mode. In record mode, the LCD is used as a viewfinder in which the user may view an object or scene before taking a picture. In play mode, the LCD is used as a playback screen for allowing the user to review previously captured images either individually or in arrays of four, nine, or sixteen images.

Digital camera user interfaces typically include a number of buttons or switches for setting the camera into one of the two modes and for navigating between images in play mode. One type of camera, for instance, includes two navigation buttons labeled "−" and "+", a mode button, a display button, a zoom button and a delete button. Play mode for this camera begins with a default screen displaying a full-sized individual image. Other images stored in the camera may then be displayed in a backward or forward sequence by pressing the "−" and "+" navigation buttons, respectively. Pressing the mode button during play mode causes four images to be displayed in a 2×2 array, and pressing the mode button again causes nine images to be displayed in a 3×3 array. The user can then "page" through screens of image arrays by pressing the navigation buttons, or the user can move from image to image in the arrays by first pressing the display button and then traversing across the images in the rows of the arrays using the navigation buttons. The user may have the full-sized image displayed of a chosen image by pressing the zoom button or can delete the image by pressing the delete button.

Although digital cameras that have both a record mode and a play mode are more versatile than digital cameras having only the record mode, two mode digital cameras suffer from several disadvantages associated with the camera's user interface. One disadvantage is that having only two modes means that either the camera only has a limited number of functions, or that several functions must be accessed in play mode since the record mode only has one function, capturing images. The disadvantages of having several functions in one mode is that the functions may have to be accessed through multiple levels of navigation screens, which complicates the operability of the camera.

Another disadvantage of conventional cameras is that the operation of user interface is non-intuitive, especially for the novice user. The user interface is non-intuitive because the operation of the user interface across different modes and/or navigation screens is inconsistent. Accessing most features in the two mode camera described above, for instance, requires that the user press the keys of the interface in a certain sequence. Each of these key sequences may be different depending on which play-mode navigation screen is displayed, the navigation screen showing individual images or the navigation screen showing arrays of images. For example, the function of the display button changes when the navigation screens change, and in some situations where the display button has been depressed, the mode button either becomes inoperable or the functionality of mode button becomes mutually exclusive with the functionality of the zoom button. Furthermore, because each navigation screen has a different key sequence, it is not obvious to the user how to exit that screen or how to choose a particular function. Thus, this type of user interface requires that the user memorize a different key sequence for each navigation screen before being able to effectively operate the camera.

A further disadvantage of conventional digital-camera user-interfaces is that the camera is capable of displaying only the images themselves, or a combination of an image and its image number. The user interface is either incapable of delivering further information regarding displayed images and the camera features, or accessing such information requires the user to enter another non-intuitive and complicated key sequence.

The assignee of the present application has developed a software-based digital camera architecture in which the basic functionality of the camera is controlled by an operating system. The use of the operating system inside the camera provides several significant advantages, one of which is that application programs may be loaded and run on the camera. Some of the applications envisioned to run on the digital camera may originate from the personal computer (PC) environment, such as imaging editing functions found in programs like Adobe Photoshop, for instance, and frame effects found in a number of different programs, such as Quark Express, which allow users to apply frames to pages and images.

Although such application programs exists in the PC environment, the use of such programs in digital cameras is precluded due to their nature and design. Most PC imaging applications are designed for the most part for professionals and are full of imaging features and effects. This makes the programs extremely large and memory intensive, which is unsuitable for use in digital cameras which have severe memory constraints.

And since the user interfaces of such programs are designed for use by professionals, their user interfaces are not very intuitive. Most imaging application user interfaces are highly complex and have a laborious way for users to apply imaging effects to images by opening dialog boxes, entering dialogs, and entering desired parameters and so on for each chosen effect. Each of these actions is all but impossible in digital cameras not only because of limited memory, but also because of the small size of the displays found on digital cameras.

Accordingly, what is needed is an improved user interface for a multi-mode digital camera. What is also needed is an improved interface for application programs running on the camera that is sufficiently intuitive and simple to allow operation by the general public. The present invention addresses these needs.

SUMMARY OF THE INVENTION

The present invention provides a method and system for integrating a user interface across multiple operating modes of a digital imaging device wherein mode-specific items are displayed on a display when the digital imaging device is placed into a particular operating mode. The digital imaging device includes a first and a second navigation button for interacting with the operating modes, where the first navigation button has a first orientation and the second navigation button has a second orientation. The method includes the step of mapping an aligned set of mode-specific items in the display to the orientation of the first navigation button. After the mode-specific items are displayed, the user scrolls from one mode-specific item to the next in the aligned set by pressing the first navigation button, and the display indicates which of the mode-specific items is a currently active item. After a mode-specific item becomes the active item, additional information is displayed corresponding to the currently active item in the display in a location that is offset from the active item in a direction of orientation corresponding to that of the second button. In certain modes, the additional information includes a list of information items that is displayed in an alignment corresponding to the orientation of the second button, wherein the user can scroll through the list of information items using the second navigation button.

In a second aspect of the present invention, the method and system integrate a user interface of an application program with the user interface of the digital imaging device, wherein the application program is for applying a plurality of imaging effects to captured images. The method and system include selecting one of the captured images, and applying the plurality of effects to the selected image to provide a plurality of preview results. The selected image is then displayed in a portion of the display along with the plurality of preview results, which are displayed as an aligned set of application specific items, to thereby provide a real-time preview of each type of effect applied to the selected image. The user may then scroll from one application-specific item to the next in the aligned set by pressing the first navigation button in order to select one of the effects to permanently apply to the selected image.

According the second aspect of the present invention, the user interfaces of software applications are unified with the digital imaging device user interface so that users accustomed to the operation of the digital imaging device do not have to learn a different, more complicated user interface. In addition, the application user interface conforms to the limited size LCD and makes the operational characteristics of different application programs run on the digital imaging device to be extremely simple and intuitive. Thus, the simplified and intuitive interface of the present invention effectively broadens the market of complicated imaging software to novice users.

DETAILED DESCRIPTION OF THE INVENTION

The present invention relates to an improvement in user interfaces of digital imaging devices, including digital cameras. The following description is presented to enable one of ordinary skill in the art to make and use the invention and is provided in the context of a patent application and its requirements. Although the present invention will be described in the context of a digital camera, various modifications to the preferred embodiment will be readily apparent to those skilled in the art and the generic principles herein may be applied to other embodiments. That is, any digital imaging device which displays images, icons and/or other items, could incorporate the features described herein below and that device would be within the spirit and scope of the present invention. Thus, the present invention is not intended to be limited to the embodiment shown but is to be accorded the widest scope consistent with the principles and features described herein.

The present invention is a method and system for integrating an application graphical user interface with a graphical user interface of a digital camera. The integrated user interface between the application program and the digital camera includes a user controlled horizontal interaction following by a reply from the camera of go a vertical display of additional information in response to the user controlled horizontal interaction.

Figure 1:
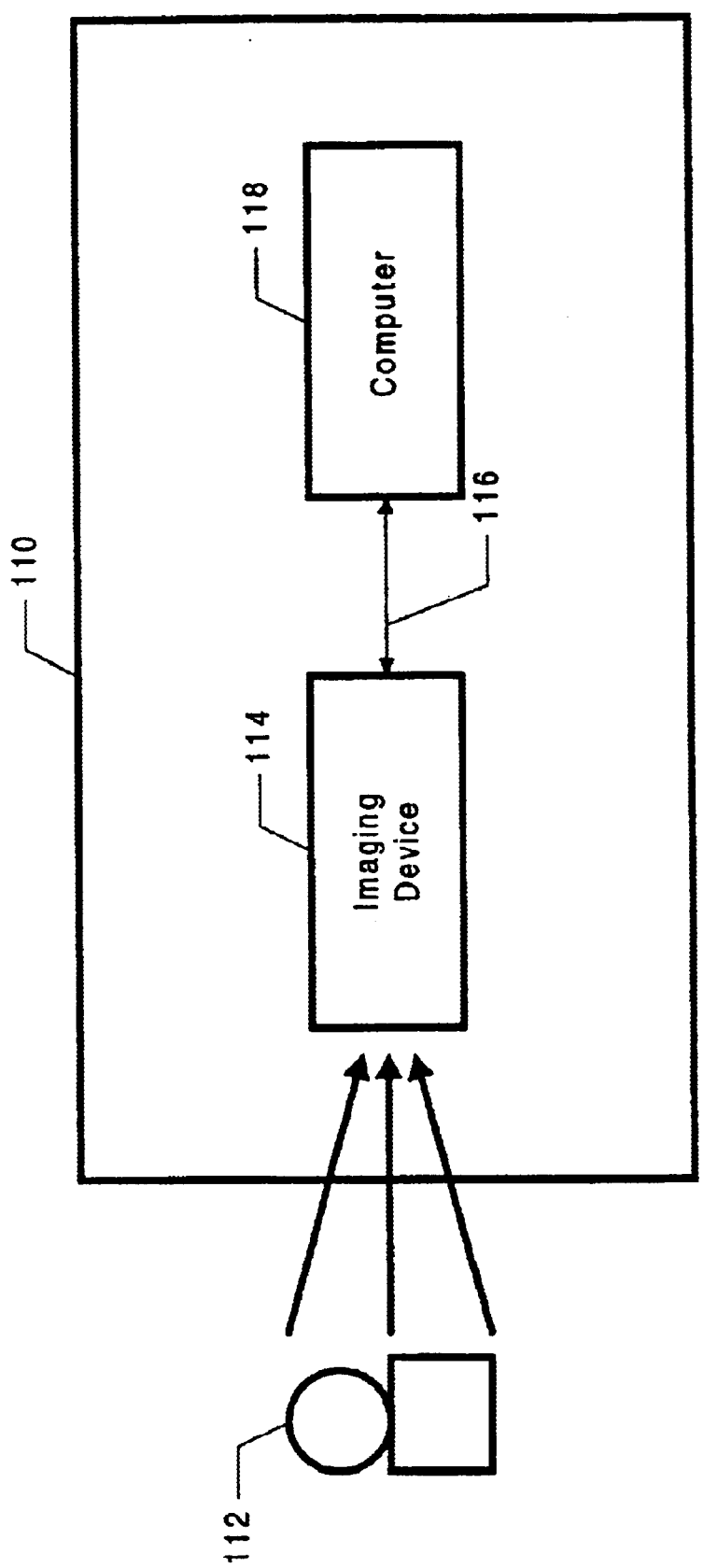
FIG. 1 is a block diagram of a digital camera that operates in accordance with the present invention.

Referring now to FIG. 1, a block diagram of a digital camera 110 is shown for use in accordance with the present invention. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118.

Figure 2:
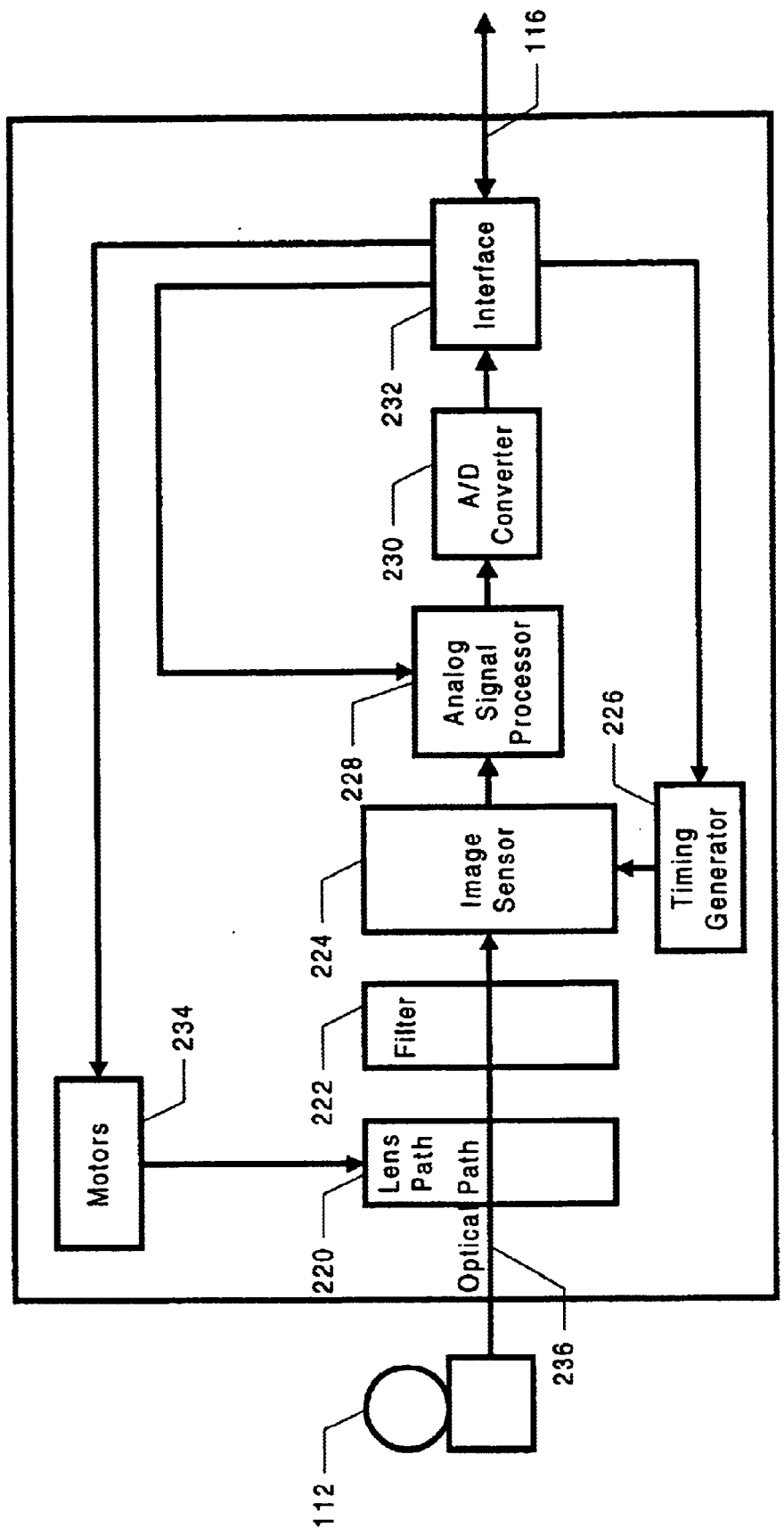
FIG. 2 is a block diagram of an example embodiment for the imaging device of FIG. 1.

Referring now to FIG. 2, a block diagram of an example embodiment of imaging device 114 is shown. Imaging device 114 typically comprises a lens 220 having an iris, a filter 222, an image sensor 224, a timing generator 226, an analog signal processor (ASP) 228, an analog-to-digital (A/D) converter 230, an interface 232, and one or more motors 234.

In operation, imaging device 114 captures an image of object 112 via reflected light impacting image sensor 224 along optical path 236. Image sensor 224, which is typically a charged coupled device (CCD), responsively generates a set of raw image data in CCD format representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118.

Figure 3:
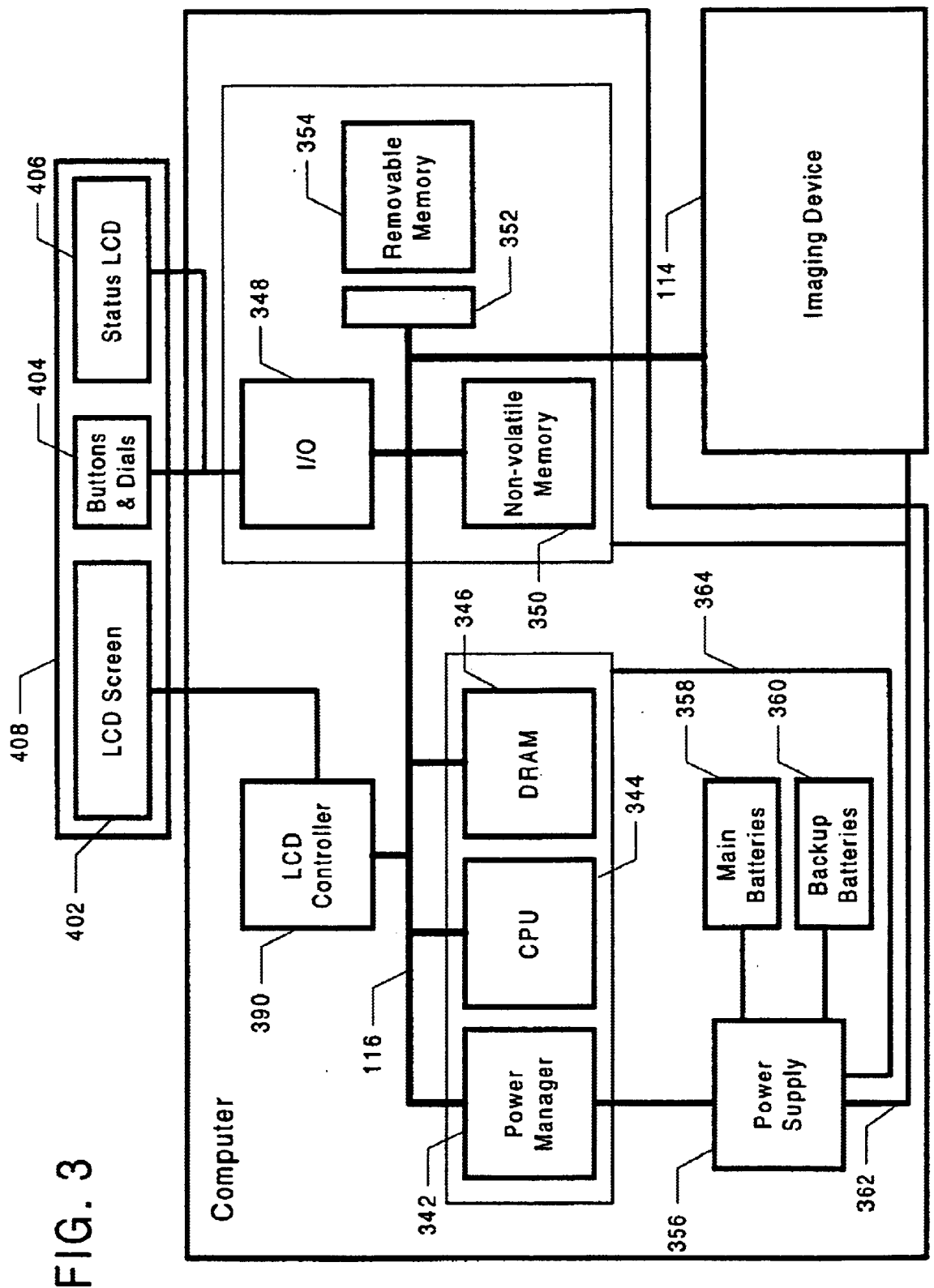
FIG. 3 is a block diagram of an example embodiment for the computer of FIG. 1.

Referring now to FIG. 3, a block diagram of an example embodiment for computer 118 is shown. System bus 116 provides connection paths between imaging device 114, an optional power manager 342, central processing unit (CPU) 344, dynamic random-access memory (DRAM) 346, input/output interface (I/O) 348, non-volatile memory 350, and buffers/connector 352. Removable memory 354 connects to system bus 116 via buffers/connector 352. Alternately, camera 110 may be implemented without removable memory 354 or buffers/connector 352.

Power manager 342 communicates via line 366 with power supply 356 and coordinates power management operations for camera 110. CPU 344 typically includes a conventional processor device for controlling the operation of camera 110. In the preferred embodiment, CPU 344 is capable of concurrently running multiple software routines to control the various processes of camera 110 within a multithreaded environment. DRAM 346 is a contiguous block of dynamic memory which may be selectively allocated to various storage functions. LCD controller 390 accesses DRAM 346 and transfers processed image data to LCD screen 402 for display.

I/O 348 is an interface device allowing communications to and from computer 118. For example, I/O 348 permits an external host computer (not shown) to connect to and communicate with computer 118. I/O 348 also interfaces with a plurality of buttons and/or dials 404, and an optional status LCD 406, which in addition to the LCD screen 402, are the hardware elements of the camera's user interface 408.

Non-volatile memory 350, which may typically comprise a conventional read-only memory or flash memory, stores a set of computer-readable program instructions to control the operation of camera 110. Removable memory 354 serves as an additional image data storage area and is preferably a non-volatile device, readily removable and replaceable by a camera 110 user via buffers/connector 352. Thus, a user who possesses several removable memories 354 may replace a full removable memory 354 with an empty removable memory 354 to effectively expand the picture-taking capacity of camera 110. In the preferred embodiment of the present invention, removable memory 354 is typically implemented using a flash disk.

Power supply 356 supplies operating power to the various components of camera 110. In the preferred embodiment, power supply 356 provides operating power to a main power bus 362 and also to a secondary power bus 364. The main power bus 362 provides power to imaging device 114, I/O 348, non-volatile memory 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364. During a power failure mode in which the main batteries 358 have failed (when their output voltage has fallen below a minimum operational voltage level) the backup batteries 360 provide operating power to power supply 356 which then provides the operating power only to the secondary power bus 364 of camera 110.

Figure 4A:
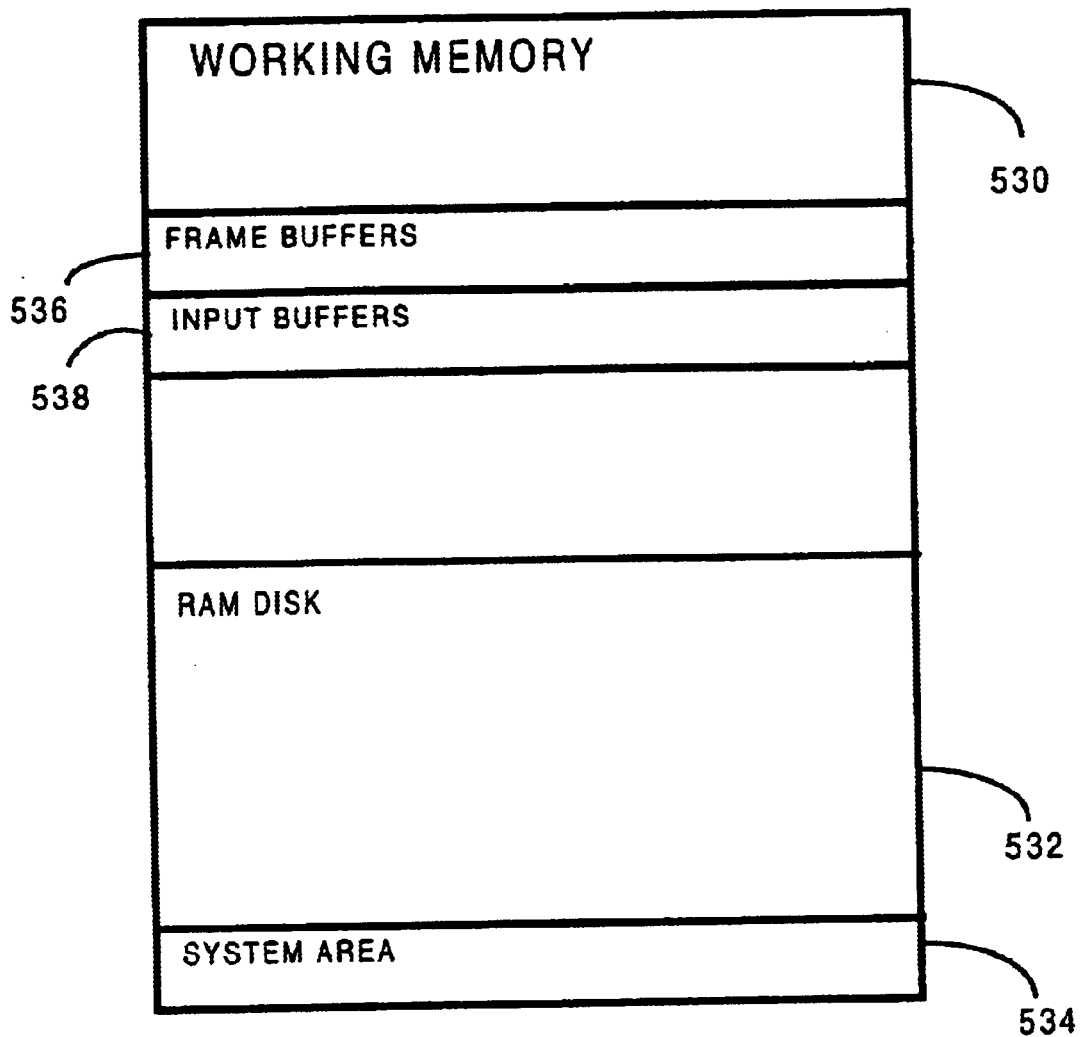
FIG. 4 is a memory map showing the preferred embodiment of the Dynamic Random-Access-Memory (DRAM).

Referring now to FIG. 4A, a memory map showing the preferred embodiment of dynamic random-access-memory (DRAM) 346 is shown. In the preferred embodiment, DRAM 346 includes RAM disk 532, a system area 534, and working memory 530.

RAM disk 532 is a memory area used for storing raw and compressed image data and typically is organized in a "sectored" format similar to that of conventional hard disk drives. In the preferred embodiment, RAM disk 532 uses a well-known and standardized file system to permit external host computer systems, via I/O 348, to readily recognize and access the data stored on RAM disk 532. System area 534 typically stores data regarding system errors (for example, why a system shutdown occurred) for use by CPU 344 upon a restart of computer 118.

Working memory 530 includes various stacks, data structures and variables used by CPU 344 while executing the software routines used within computer 118. Working memory 530 also includes input buffers 538 for initially storing sets of raw image data received from imaging device 114 for image conversion, and frame buffers 536 for storing data for display on the LCD screen 402.

In a preferred embodiment, the conversion process is performed by a live view generation program, which is stored in non-volatile memory 350 and executed on CPU 344. However, the conversion process can also be implemented using hardware. Referring again to FIG. 3, during the execution of the live view generation program (not shown), the CPU 344 takes the raw image data from the input buffers 538 in CCD format and performs color space conversion on the data. The conversions process performs gamma correction and converts the raw CCD data into either a RGB or YCC color format which is compatible with the LCD screen 402. After the conversion, CPU 344 stores the image data in the frame buffers 536. The LCD controller 390 then transfers the processed image data from the frame buffers to the LCD screen 402 (via an optional analog converter) for display.

Figure 4B:
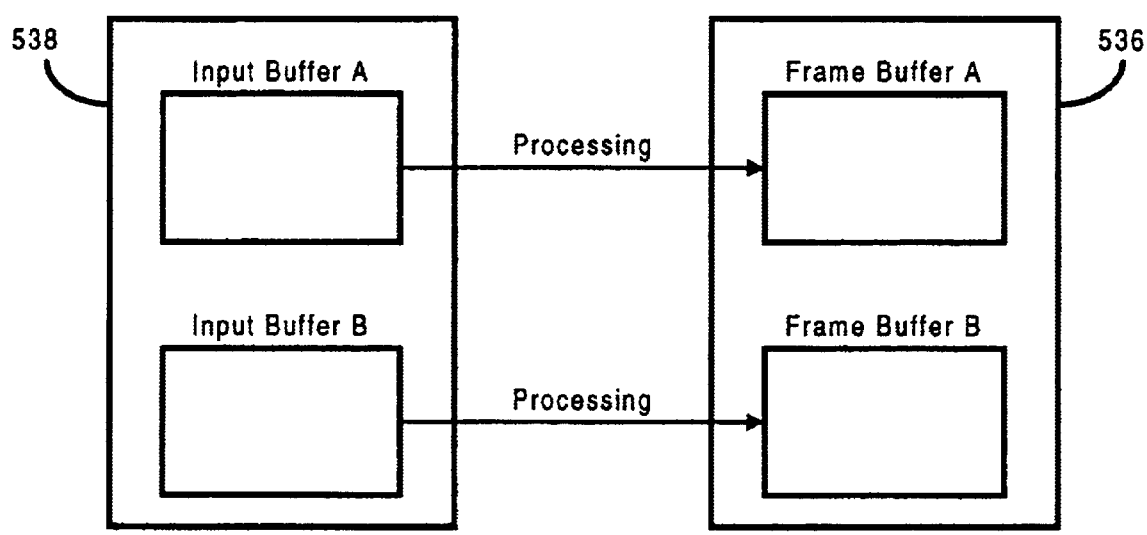

Referring now to FIG. 4B, the contents of input buffers 538 and the frame buffers 536 are shown. In a preferred embodiment, both the input buffers 538 and the frame buffers 536 utilize two separate buffers, called ping-pong buffers, to improve the display speed of the digital camera and to prevent the tearing of the image in the display 402. As shown, input buffers 538 include an input buffer A and an input buffer B, and frame buffers 536 include a frame buffer A and a frame buffer B.

The input buffers A and B alternate between an input cycle and a processing cycle. During the input cycle, the input buffers 538 are filled with raw image data from the image device 114, and during the processing cycle, CPU 344 processes the raw data and transmits the processed data to the frame buffers 536. More specifically, while input buffer A is filling with image data, the data from input buffer B is processed and transmitted to frame buffer B. At the same time, previously processed data in frame buffer A is output to the LCD screen 402 for display. While input buffer B is filling with image data, the data from input buffer A is processed and transmitted to frame buffer A. At the same time, previously processed data in frame buffer B is output to the LCD screen 402 for display.

According to the present invention, the flexible architecture of the digital camera is used to provide and integrated camera user interface. More specifically, the present invention provides a method and system for integrating a digital-camera user-interface across multiple operating modes of the digital camera.

Figure 5A:
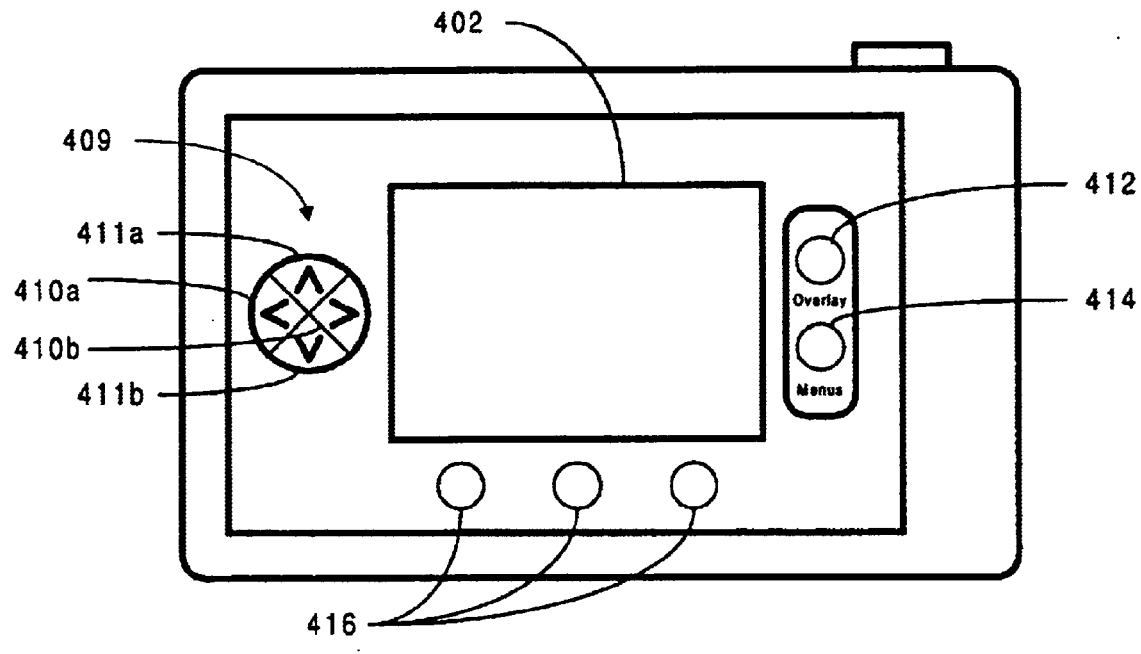
FIGS. 5A and 5B are diagrams depicting the back and top view, respectively, of a digital camera.
Figure 5B:
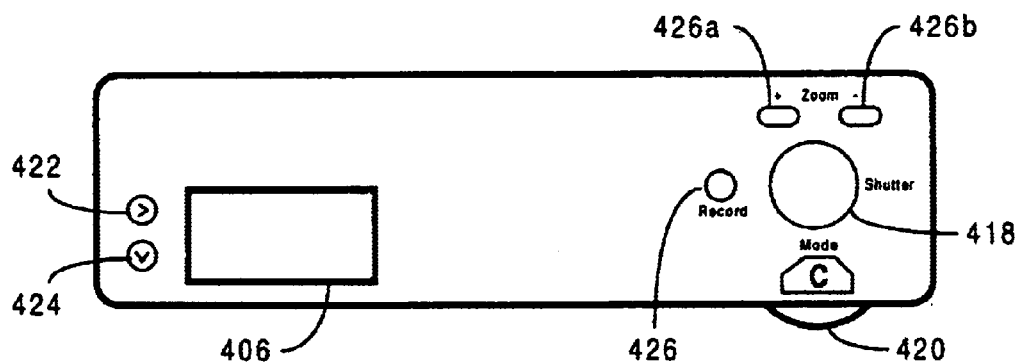

FIGS. 5A and 5B are diagrams depicting the hardware components of the camera's 110 user interface 408. FIG. 5A is back view of the camera 110 showing the LCD screen 402, a four-way navigation control button 409, an overlay button 412, a menu button 414, and a set of programmable soft keys 416. FIG. 5B is a top view of the camera 110 showing a shutter button 418, and a mode dial 420. The camera may optionally include status LCD 406, status LCD scroll and select buttons 422 and 424, a sound record button 426, and zoom-in, zoom-out buttons 426a and 426b.

In one aspect of the present invention, the user interface 408 includes several different operating modes for supporting various camera functions. However, the modes relevant to this description are review mode, menu mode, and capture (record) mode. In review mode, the camera 100 supports the actions of reviewing camera contents, editing and sorting images, and printing and transferring images. In menu mode, the camera 100 allows the user to manipulate camera settings and to edit and organize captured images. In capture mode, the camera 100 supports the actions of preparing to capture an image, and capturing an image through the use of either the LCD screen 402 or the status LCD 406.

The user switches between the review, menu, and capture modes, using the mode dial 420. When the camera is placed into a particular mode, that mode's default screen appears in the LCD screen 402 in which a set of mode-specific items, such as images, icons, and text, are displayed. According to the present invention, the user may navigate through and access the contents and features of multiple camera modes using a consistent and intuitive user interface. Throughout various operating modes, the user interface includes a user controlled horizontal interaction following by a reply from the camera of a vertical display of information. Because the user interacts with the camera in each of various camera modes using the hardware buttons in a similar manner, as described herein, the learnability and usability of the camera are enhanced.

Figure 6:
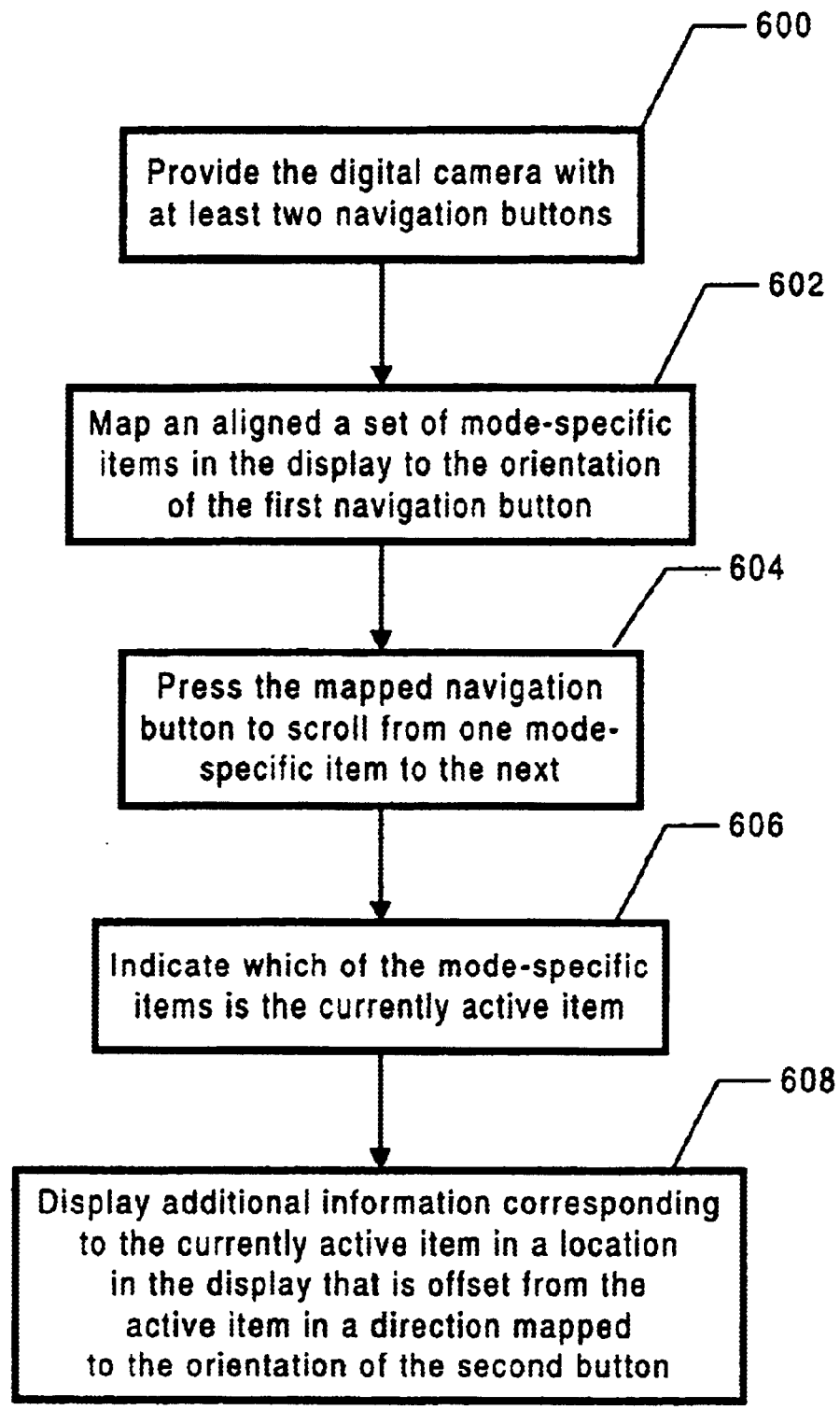
FIG. 6 is a flow chart illustrating the process of integrating a user interface across multiple operating modes of a digital camera according to the present invention.

Referring now to FIG. 6, a flow chart is shown illustrating the process of integrating a user interface across multiple operating modes of a digital camera in accordance with the present invention. Referring to both FIGS. 5A, and 6, the process begins by providing the user interface with at least two sets of navigation buttons in step 600. As shown in FIG. 5A, in a preferred embodiment of the present invention, the four-way navigation control button 409 provides the user interface with four buttons; left/right buttons 410a and 410b, which have a horizontal orientation, and up/down buttons 411a and 411b, which have a vertical orientation. In accordance with the present invention, the user uses the four way controller 409 in each of the various camera modes as a global navigational device in a way that provides the user with intuitive spatial orientation when navigating through the modes, as explained further below.

Referring again to FIG. 6, after the camera is placed into a particular mode, a set of mode-specific items are aligned in the LCD screen 402 so that the alignment of the mode-specific items maps to the natural spatial orientations of one set of navigation buttons on the four way controller in step 602.

Figure 7:
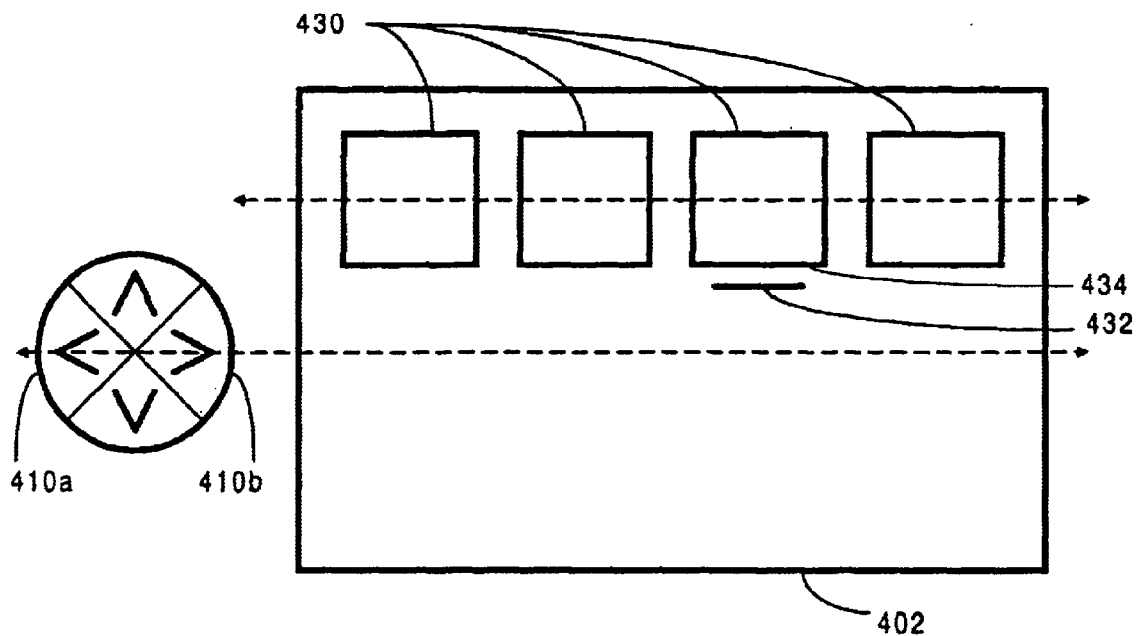
FIG. 7 is a block diagram illustrating a preferred embodiment of the present invention in which the alignment of the mode-specific items are mapped to the orientation of the horizontal navigation buttons.

FIG. 7 is a block diagram illustrating a preferred embodiment of the present invention in which the alignment of the mode-specific items 430 are mapped to the orientation of the horizontal navigation buttons 410a and 410b. As shown, mapping the alignment of the mode-specific items 430 to the orientation of the horizontal navigation buttons 410a and 410b causes the mode-specific items 430 to be displayed in a row(s) across the LCD screen 402. Rather than mapping the alignment of the mode-specific items 430 to the orientation of the horizontal navigation buttons 410, the mode-specific items 430 may also be mapped to the orientation of the vertical navigation buttons 411a and 411b. This would cause the mode-specific items to be displayed in a column in the LCD screen 402. Additionally, the alignment of the mode-specific items 430 may be mapped to other navigation button orientations (e.g. a diagonal orientation) if so desired.

Referring again to FIG. 6, after the mode-specific items 430 are displayed, the user can scroll or navigate from one mode-specific item 430 to the next by pressing the mapped navigation buttons in step 604. In FIG. 7 for example, pressing navigation button 410b causes a right scrolling action, and pressing navigation button 410A causes a left scrolling action. As the user scrolls through the mode-specific items 430, the camera displays an indication 432 of which one of the mode-specific items 430 is a currently active item 434 in step 606. This indication 432 may take the form of a highlight, a stationary or moving pointer, the active item 432 itself may blink, or a different type of mode-specific item may be shown to indicate an active/inactive status.

After a particular mode-specific item 430 has become the active item 434, additional information 436 corresponding to the active item is displayed in the LCD screen 402 in a location offset from the active item 434 in a direction mapped to the orientation of the second set of navigation buttons in step 608.

Figure 8:
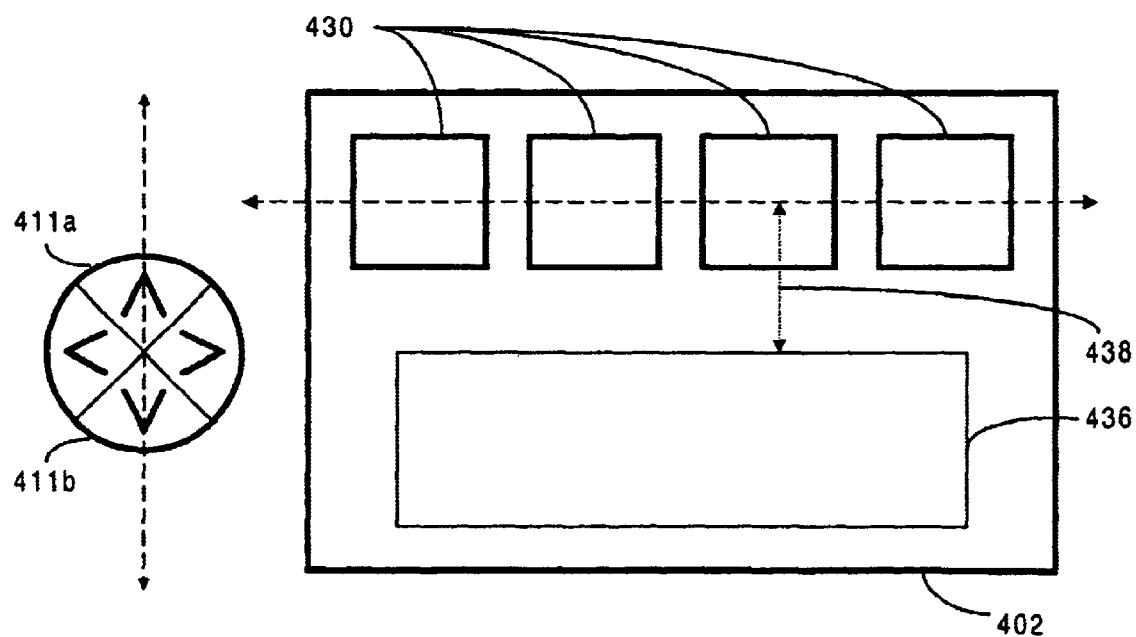
FIG. 8 is a block diagram of the user interface illustrating that when the mode-specific items are displayed horizontally, information corresponding to an active item is displayed vertically offset from the row of mode-specific items.

FIG. 8 is a block diagram of the user interface illustrating that when the mode-specific items 430 are displayed horizontally, the information 436 corresponding to the active item 434 is displayed in an area of the LCD screen 402 that is vertically offset 438 from the horizontal row of mode-specific items, and that the direction of offset 438 is parallel to the orientation of the vertical navigation buttons 411a and 411b.

According to the present invention, throughout the various operating modes of the camera, the integrated user interface maintains an interaction model in which the user scrolls horizontally to select an active mode-specific item, followed by a vertical display of additional information in the LCD screen 402 relating to the active item. And in certain modes, the additional information includes a list of information items that is displayed in an alignment corresponding to the orientation of the vertical navigation buttons 411a and 411b, wherein the user can scroll through the list of information items using those buttons.

By mapping both the modes of navigation and the display of mode information to the orientation of the navigation buttons 410 and 411 of the four way controller, the user essentially only has to learn one major mechanism for interacting with the multiple modes of the digital camera. That is, since the user interface interacts with each of the camera modes using only the four-way controller 409, the integrated user interface of the present invention significantly reduces the-amount of key sequences the user must memorize in order to operate the camera. The preferred implementations of the review mode, the menu mode, and the capture mode are described below to further explain the integrated user interface of the present invention.

Figure 9:
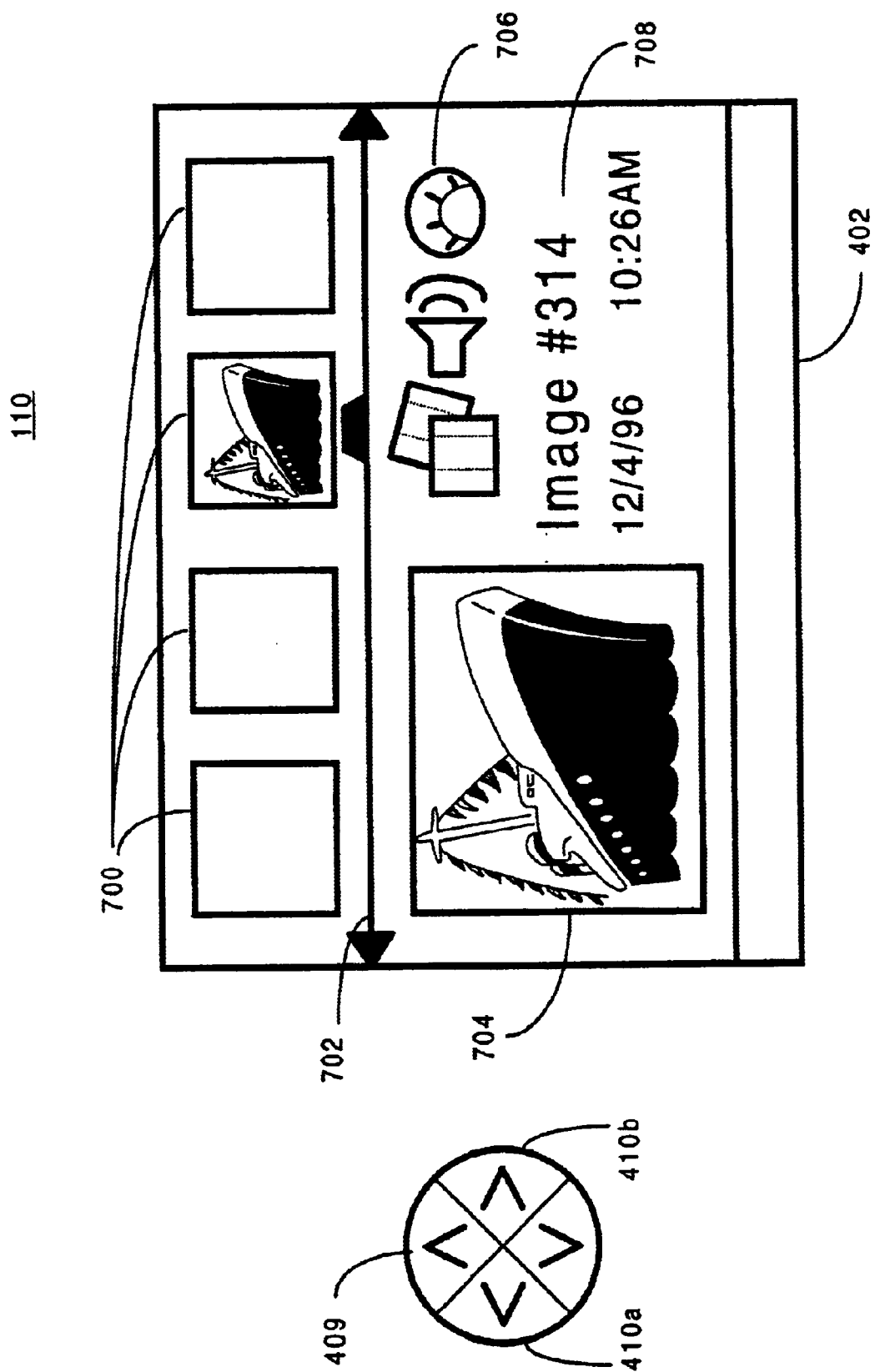
FIG. 9 is a diagram illustrating the operation and appearance of the integrated user interface during review mode in accordance with a preferred embodiment of the present invention.

Referring now to FIG. 9, a diagram illustrating the operation and appearance of the integrated user interface during review mode is shown in accordance with a preferred embodiment of the present invention. Moving the mode dial 420 (FIG. 5B) to access the review mode enables the user to view all the images in the camera along with specific attributes associated with each of the images.

The mode-specific items displayed across the LCD screen 402 in review mode are thumbnail images 700 that represent small-sized versions of the captured images. The thumbnails 700 are intended to serve as navigational aides rather than accurate representations of their images. As a result, the thumbnails 700 are cropped to a square size (50×50 pixels). A stationary selection arrow line 702 is used as both a navigational aid and to indicate which thumbnail is the currently active image.

In a preferred embodiment, the review screen layout displays four thumbnails 700 at a time and is based on a filmstrip metaphor which allows users to quickly move forward and backward among pictures chronologically. The user may navigate through the series of displayed thumbnails 700 in the LCD screen 402 using the four-way navigation control button 409. When the user holds down the left/right buttons 410, the thumbnails 700 are scrolled-off the LCD screen 402 and replaced by new thumbnails 700 representing other captured images to provide for fast browsing of the camera contents. When there are more than four images in the camera, the selection arrow line 702 displays arrow heads to indicate movement in that direction is possible with the left/right navigation buttons 410. As the user presses the navigation buttons 410 and the thumbnails 700 scroll across the LCD screen 402, the thumbnail 700 that is positioned over a notch in the selection arrow line 702 is considered the active image.

When a thumbnail 700 becomes the active image, additional information corresponding to that image is automatically displayed vertically offset from the row of thumbnails 700 in the LCD screen 402. In a preferred embodiment, the additional information includes a large thumbnail 704 showing a larger view of the active thumbnail, and image information comprising an icon bar 706 and text 708. The icon bar may display several icons indicating the media types associated with the active image, such as whether the image is a still, a time lapse, or a burst image, whether sound is attached to the image, and a category for the image. The displayed text 708 may include a specification of the name or number of the image, and the date and time the image was captured.

Figure 10A:
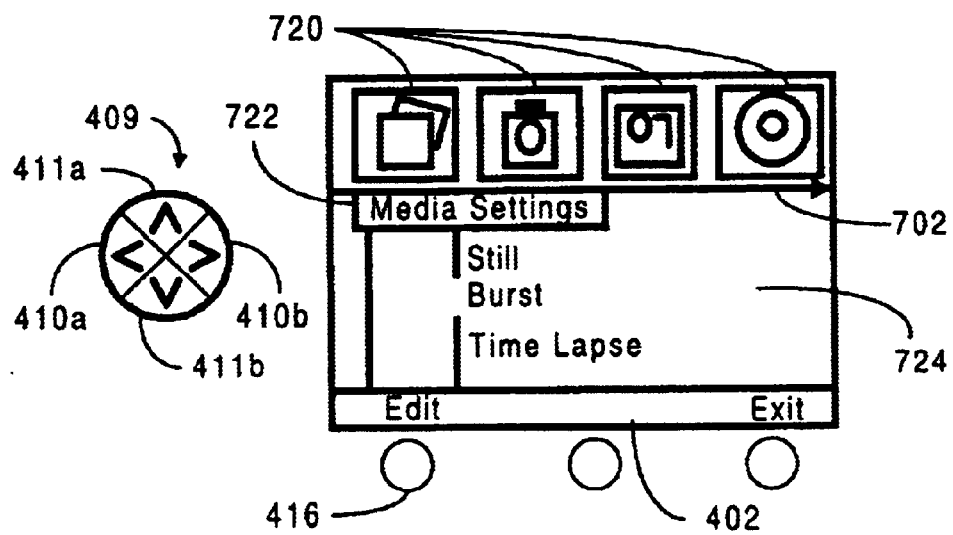
FIGS. 10A and 10B are diagrams illustrating the operation and appearance of the integrated user interface during menu mode in accordance with a preferred embodiment of the present invention.
Figure 10B:
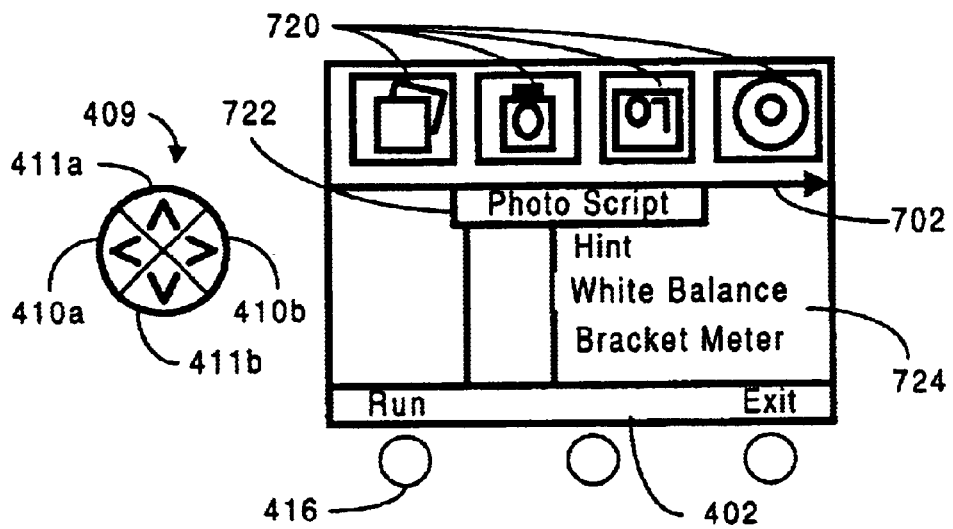

Referring now to FIGS. 10A and 10B, diagrams illustrating the operation and appearance of the integrated user interface during menu mode are shown in accordance with a preferred embodiment of the present invention. Menu mode may be accessed during other camera modes by pressing the menu button 414 or the soft keys 416 (see FIG. 5B) on the camera interface; and pressing the menu button 414 again exits the mode. Similar to the review mode, the menu mode is divided into horizontal and vertical elements, and is also capable of supporting various levels of sub menus.

The menu-mode is capable of displaying multiple levels of navigation in the menu structure. In the first level of menus, the mode-specific items displayed in a row across the LCD screen 402 are graphical icons 720 representing menu categories for camera and image settings. In accordance with the integrated user interface of the present invention, the user may first select a menu category by navigating horizontally across the LCD screen 402 using the horizontal navigation control button 410, and then select a menu item by navigating vertically in the display using the vertical navigation control buttons 411.

When navigating horizontally from icon to icon 720 in the LCD screen 402, arrows on selection arrow line 702 indicate to the user which direction they can navigate. In the example shown in FIGS. 10A and 10B, the right arrow underneath the icon row indicates that the user can only scroll right and that more icons 720 are available past the fourth icon 720 in the row. In a preferred embodiment, the icons are stationary in the LCD screen 402, and as the user presses the left/right buttons 410, each icon 720 in turn becomes the active icon. If the fourth icon 720 is active and the user presses the right navigation button 410b, then the display would "page" to reveal the next set of icons 720. In an alternative embodiment, the icons 720 scroll on and off the LCD screen 402 as the user presses the left/right buttons 410.

When an icon becomes active, the icon 720 is highlighted, a text label 722 for the icon is displayed under the icon 720, and a list of menu items corresponding to camera features is displayed below the text label 722 in an alignment mapped to the orientation of the up/down buttons 411. FIG. 10A shows an example menu displayed below the text menu corresponding the first icon in the row. After a menu is displayed, the user can then vertically scroll through the list of menu items by pressing the up/down buttons 411, causing a highlight to move up and down the feature list. FIG. 10B illustrates the result of the user scrolling to the second icon in the row, which causes the menu for that icon to be displayed.

In a preferred embodiment, sub-levels of menus may be displayed if necessary by pressing other buttons on the camera, such as a soft key 416. When a secondary level of menus is available, text such as "edit", "next", or "more" may appear above a soft key 416, as shown. By pressing the soft key 416 under this text, a secondary menu will be displayed in the same fashion as the first level. Pressing the "edit" soft key again in the second level menu, brings up another level, and so on.

Figure 11A:
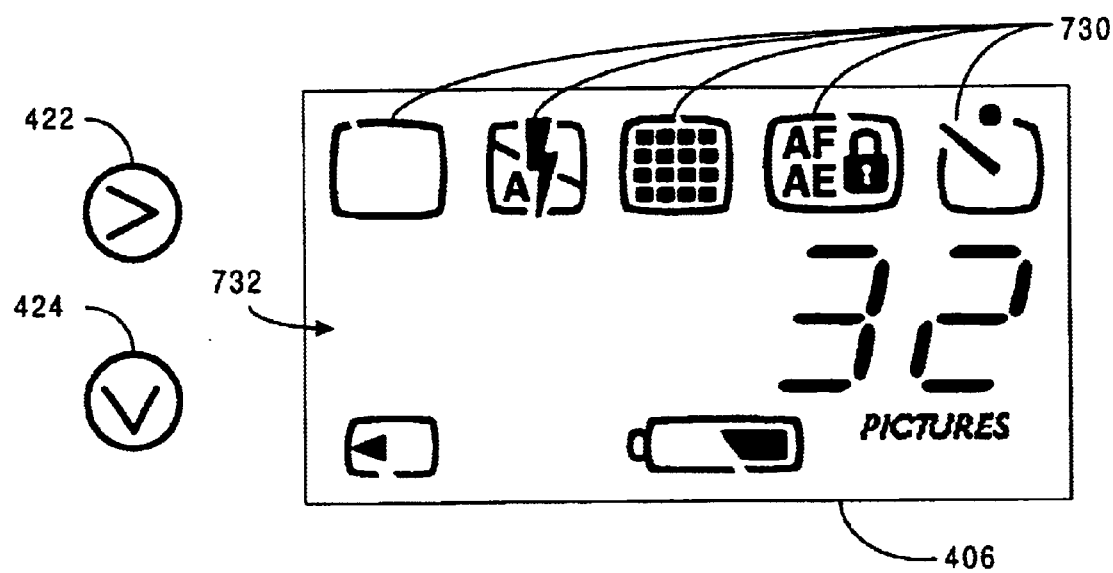
FIGS. 11A and 11B are diagrams illustrating the operation and appearance of the integrated user interface during capture mode in accordance with a preferred embodiment of the present invention.
Figure 11B:
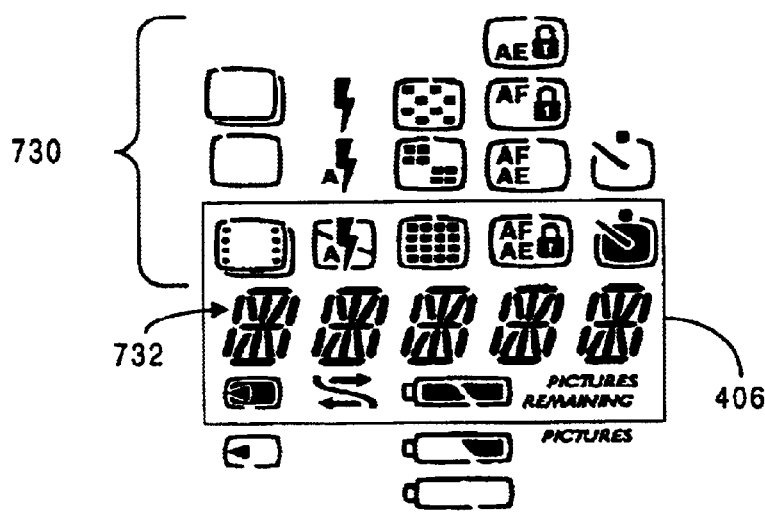

Referring now to FIGS. 11A and 11B, diagrams illustrating the operation and appearance of the integrated user interface during capture mode are shown in accordance with a preferred embodiment of the present invention. Because most of color LCD technology in use today may have disadvantages in terms of power consumption and viewability, the present invention includes the status LCD 406 in the user interface 110 to act as a supplementary capture interface to compensate for the restrictions of the LCD screen 402. The optional status LCD 406 provides image capture and feature setting capability without using the color LCD screen 402.

Similar to the modes described above, the status LCD 406 in capture mode is divided into horizontal and vertical elements. Referring to FIG. 11A, the horizontal mode-specific items displayed across the status LCD 406 are icons 730 that enable the user to set the following preferred set of features; image capture type, flash, image compression level, exposure/focus lock, and self timer. In accordance with the integrated user interface, the user navigates through the status LCD 406 using a horizontal scroll button 422 and a vertical select button 424, although the four-way controller 409 may optionally be used in an alternate embodiment.

To navigate the status LCD 406, the user presses horizontal scroll button 422 to activate individual icons across the top row with each press. Active icons are preferably identified by blinking on and off. To modify the current setting associated with an active icon 730 the user presses the vertical select button 424 to toggle the setting to the desired state. To reinforce the meaning of the active icon state, an alphanumeric display 732 is used to spell out the current setting of the active icon. Each time the user presses the vertical select button 424, the state of the active icon state changes, and the alphanumeric display 732 displays text corresponding to that state.

FIG. 11B is diagram illustrating the possible icon 730 states for the status LCD 406 in a preferred embodiment of the present invention. The first icon 730 in the icon row represents the image capture type settings, and the possible states shown from top to bottom correspond to burst, still, or time-lapse image capture type. The second icon 730 represents the flash setting, and the possible states shown are on, auto, and off. The third icon 730 represents the image compression level, and the possible states shown are good, better, and best. The fourth icon 730 represents the exposure/focus lock setting, and the possible states shown are auto exposure (AE) lock, auto focus (AF) lock, AF/AE active, and AF/AE lock. And the last icon 730 in the icon row represents the setting for the self timer, and the possible states shown are off and on.

As just described, throughout the various operating modes of the camera, the integrated user interface maintains an interaction model in which the user scrolls horizontally to select a mode-specific item, followed by a vertical display of additional information in the LCD screen relating to that selected item. Using the integrated user interface of the present invention, the user can navigate, manipulate, and view camera contents using a consistent and intuitive spatial navigation technique that frees the user from entering long key sequences, and thereby increases the ease of use and operation of the digital camera. The display of the user interface throughout the various operating modes is controlled through software running on CPU 344.

Figure 12:
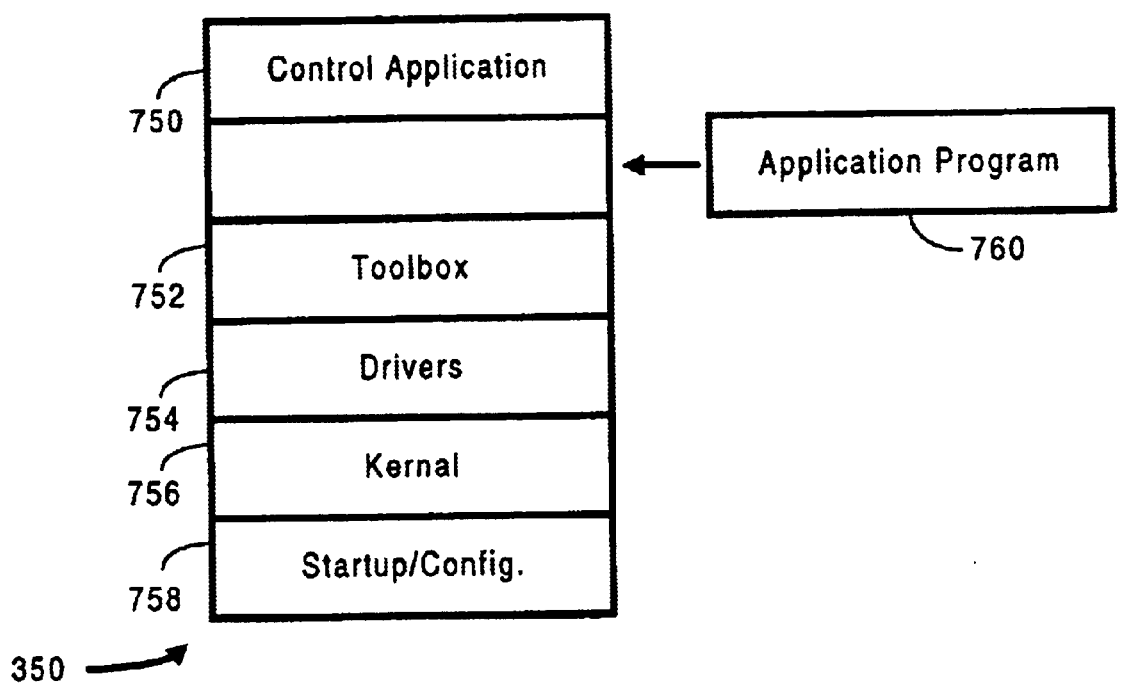
FIG. 12 is a block diagram illustrating the contents of the non-volatile memory in which the digital camera software is stored.

FIG. 12 is a block diagram illustrating the software organization in the nonvolatile memory 350 in which the digital camera software is stored. The software 740 comprises a control application 750, a tool box 752, a set of drivers 754, a kernel 756, and a startup/configuration module 758.

The control application 750 is the main program that controls high-level functions of the digital camera and is responsible for interfacing with functions in the tool box 752. The tool box 752, in turn, controls how the digital camera captures and manipulates images. The drivers 754 help control the I/O 348 interface for external communication; the kernel 756 controls basic operating system functions; and the startup/configuration module 758 controls the camera's boot-up process.

In a second aspect of the present invention, an application program 760 may be loaded into the digital camera either from removable memory 354 (FIG. 3), or downloaded from a host computer or from a network to run in place of the control application 760.

When the camera 110 is first turned on and booted up, the startup/configuration 758 module begins to execute and loads the drivers 754 and the kernel 756 into DRAM 346. Included in the ROM 350 is a system file that contains configuration information for the digital camera 110. The application program 760 on the removable memory 354 may also include its own system folder in order to alert of the digital camera 110 of the presence of the new application. After the kernel 756 is loaded, the startup/configuration module 758 searches for the system folder in both the DRAM 346 and the removable memory 354. If a system folder exists in both the DRAM 346 and the removable memory 354, then in a preferred embodiment, the system file on the removable memory 354 is used. The startup/configuration 758 module then loads the application program into DRAM 346, and control of the camera is passed to the application program 760. In a preferred embodiment, the type of application programs most suitable for use with the digital camera are application programs 760 that enable a user to apply imaging effects to captured images. As stated above, however, typical imaging application programs are too large and their user interface too complex for such applications to run on the digital camera.

According to the present invention, the application user interface is integrated with the user interface of the multi-mode digital camera described above to simplify the application user interface so that it is compatible with the limited size LCD 402 and to reduce the learning curve associated with new applications.

Figure 13:
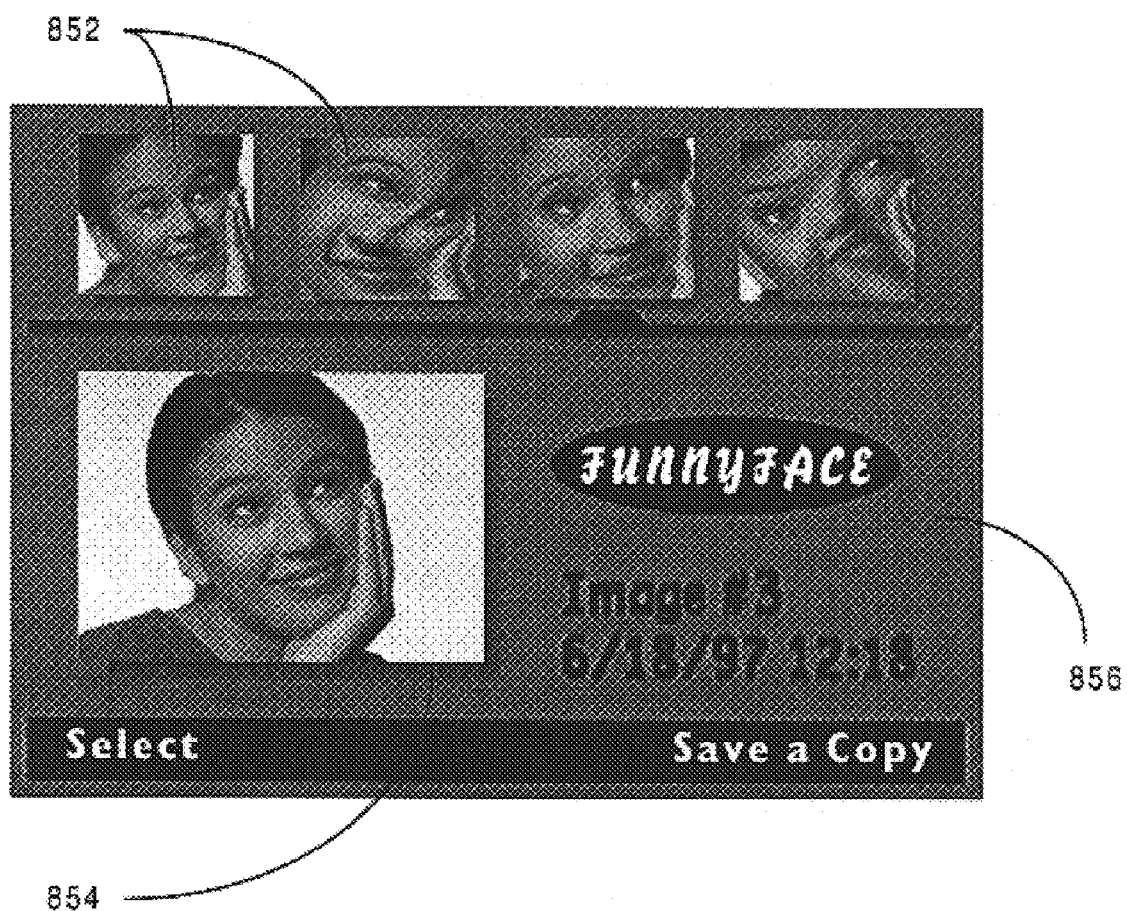
FIG. 13 is a diagram illustrating the operation and appearance of the integrated application user interface in accordance with a preferred embodiment of the present invention.

Referring now to FIG. 13, a diagram illustrating the operation and appearance of the integrated application user interface is shown in accordance with a preferred embodiment of the present invention. Similar to review mode, the application user interface 850 includes an alignment of application-specific items 852, a large thumbnail 854, and an icon and text area 856.

In operation, the user selects an image during review or play mode to edit and then invokes the imaging application 850. In a preferred embodiment, instead of including many different categories of imaging editing functions and effects, the imaging application 850 comprises algorithms for implementing variations of only one category of effects to save memory. However, any number of different effects categories may be included in a single application, assuming sufficient memory is available.

When the application program is executed, the selected image is displayed as the large thumbnail 854, and the different type of effects provided by the application are automatically applied to the selected image. The results of the different types of effects applied to the selected images are shown in the application-specific items 852 as thumbnail images to provide the user with a real-time preview of the results.

An example effect category for the imaging-application is a distortion effect, the application for which is shown in FIG. 13. The distortion effect application allows a user to select and apply different types of distortion effects to an image. If desired, the name of the effect may be displayed in the in icon and text area 856. The name of the distortion effect in this example is "Funnyface." The different types of distortion effects comprising the "Funnyface" application may include a swirl effect, an enlarge effect, a fish-eye effect, and so on. Each of these different types of distortion effects is applied to the image represented by the large thumbnail 854 and displayed as a thumbnail is image 852. The user may then scroll through the thumbnails 852 displaying the preview results and select one of the effects to permanently apply to the selected image. The resulting image can then be saved and/or printed.

Figure 14:
FIGS. 14 and 15 are block diagrams illustrating examples of imaging applications comprising other categories of imaging effects.
Figure 15:
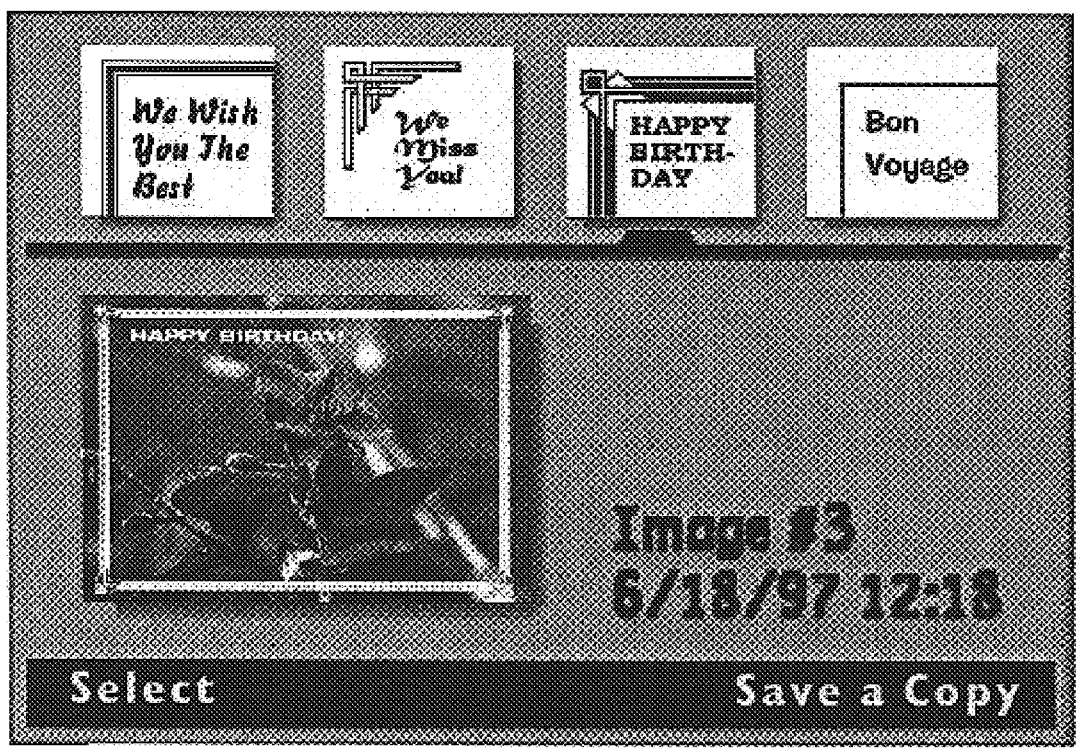

FIGS. 14 and 15 are block diagrams illustrating examples of imaging applications comprising other categories of imaging effects. FIG. 14 illustrates a painters effect 20 application, which allows a user to apply a various painting or painter's styles to images, such as "Van Gogh," for example. FIG. 15 illustrates a frame type of application, which allows a user to apply decorative borders and frames to images, which can be saved, printed, or sent as greeting cards via the Internet. Another type of imaging application (not shown) is a castaway effect, which applies and removes color casts to, and from, images.

While the user navigates between the types of effect in a particular application using the left/right control buttons 410a and 410b, the user may also "fine tune" a currently selected effect by pressing the up/down control buttons 411a and 411b, which incrementally changes the effect applied to the image. For example, assume a user has selected a swirl type of distortion while running the distortion application. Pressing the up arrow 411a may cause incrementally tighter swirls, while pressing the down button 411b may cause less of a swirl effect. In the frames application as another example, the up/down buttons 411 may be used to select different tag lines to add to a currently selected border, such as "Happy Birthday," "Wish You Were Here," etc.

Because of memory constraints, in a preferred embodiment the effect provided by the imaging application is applied only to the currently selected image. However, if sufficient memory is available, then the imaging application may be written so that the user can scroll through captured images to see a preview of the effect applied to each image. Also if the removable memory 354 is large enough, several different imaging applications may be included on the same removable memory 354 so that the user can choose which application to run based on the effect desired.

A method and system for integrating an application user interface with a digital camera user interface has been disclosed. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing a user interface for a digital camera having a display, a first button having a first orientation, and a second button having a second orientation, the digital camera having a plurality of captured images, the method comprising the steps of:

a) selecting one of the captured images;

b) executing an application program on the digital camera that applies a plurality of effects to the selected image to provide a plurality of real-time preview results;

c) displaying the plurality of real-time preview results as an aligned set of thumbnail images in the display to thereby provide a real-time preview of each type of effect applied to the selected image, wherein all the thumbnail images are displayed in an alignment that is mapped to the orientation of the first button to create a mapped navigation button;

d) scrolling the thumbnail images in response to a user pressing the mapped navigation button wherein the display indicates which of the thumbnail images is a currently selected effect, and wherein the thumbnail images are scrolled-off the display and replaced by new thumbnail images;

e) applying the selected effect to the selected image to create a large modified thumbnail image and displaying the large modified thumbnail image in the display in a location that is offset from the aligned set of thumbnail images in a direction of orientation corresponding to that of the second button; and f) providing the digital camera with multiple operating modes, wherein when the digital camera is in at least one of the operating modes the user navigates both the application program and the operating mode in substantially the same manner, thereby improving ease-of-use of the digital camera.

2. The method as in claim 1 wherein step c) further includes the step of:

f) displaying additional information corresponding to the selected thumbnail image in the display.

3. A method for integrating a digital camera user interface with a user interface of an application program running in the digital camera, the digital camera including a display, a first button having a first orientation, and a second button having a second orientation, the method comprising the steps of:

a) providing the digital camera with at least two operating modes, wherein when the digital camera is placed into at least one of the operating modes, mode-specific items corresponding to that mode are displayed on the display by;

a1) displaying mode-specific items in the display such that all the mode-specific items are displayed in an alignment that is mapped to the orientation of the first button to create a mapped navigation button, a2) scrolling the mode-specific items in response to a user pressing the mapped navigation button wherein the display indicates which of the mode-specific items is a currently selected item, and wherein the mode-specific items are scrolled-off the display and replaced by new mode-specific items;

a3) displaying additional information corresponding to the selected image in the display in a location that is offset from the active item in a direction of orientation corresponding to that of the second button;

b) executing the application program on the digital imaging device for applying a plurality of effects to a selected image stored in the digital imaging device; and c) in response to executing the application program on the digital imaging device,
   c1) automatically applying each one of the plurality of effects to the selected image to provide a plurality of real-time preview results,
   c2) displaying the plurality of real-time preview results as a set of application specific items in the display such that all the application specific items are displayed in an alignment that is mapped to the orientation of the mapped navigation button,
   c3) scrolling the application-specific items in response to a user pressing the mapped navigation button wherein the display indicates which of the application-specific items is a currently selected effect, and wherein the application specific items are scrolled-off the display and replaced by new application specific items,
   c4) applying the selected effect to the selected image to create a large thumbnail, and
   c5) displaying the large thumbnail in the display in a location that is offset from the aligned set of application-specific items in a direction of orientation corresponding to that of the second button, wherein the user navigates both the operating modes digital camera and the application program in substantially the same manner, thereby improving ease of use of the digital camera.

4. The method as in claim 3 wherein step c5) further includes the of:
   c5i) displaying additional information corresponding to the selected effect.

5. The method as in claim 4 further including the step of:
   d) permanently applying the currently selected effect to the selected image to create a modified image.

6. The method as in claim 5 further including the step of:
   providing the first button with left and a right navigation buttons having a horizontal orientation.

7. The method as in claim 6 further including the step of:
   providing the second button with up and down navigation-buttons having a vertical orientation.

8. The method as in claim 7 wherein step c2) further includes the step of:
   c2i) displaying a set of thumbnail images as the application-specific items.

9. The method as in claim 8 wherein step c3) further includes the step of:
   c3i) pressing the up and down navigation buttons to fine-tune the selected effect.

10. The method as in claim 9 further including the step of loading the application program into the digital camera from a removable memory.

11. The method as in claim 10 further including the step of loading the application program into the digital camera from a network or host computer.

12. A computer-readable medium containing program instructions for integrating a user interface of a digital camera having a display, a first button having a first orientation, and a second button having a second orientation, the program instructions for:
   a) executing an application program on the digital camera that applies a plurality of effects to a selected image to provide a plurality of real-time preview results;
   b) displaying the plurality of real-time preview results as an aligned set of thumbnail images in the display to thereby provide a real-time preview of each type of effect applied to the selected image, wherein all the thumbnail images are displayed in an alignment that is mapped to the orientation of the first button to create a mapped navigation button;
   c) scrolling the thumbnail images in response to a user pressing the mapped navigation button wherein the display indicates which of the thumbnail images is a currently selected effect, and wherein the thumbnail images are scrolled-off the display and replaced by new thumbnail images;
   d) applying the selected effect to the selected image to create a large modified thumbnail image and displaying the large modified thumbnail image in the display in a location that is offset from the aligned set of thumbnail images in a direction of orientation corresponding to that of the second button; and
   e) providing the digital camera with multiple operating modes, wherein when the digital camera is in at least one of the operating modes the user navigates both the application program and the operating mode in substantially the same manner, thereby improving ease-of-use of the digital camera.

13. The computer-readable medium as in claim 12 wherein step d) further includes program instruction for:
   d) displaying additional information corresponding to the selected thumbnail image in the display.

14. A system for integrating a digital camera user interface with a user interface of an application, comprising:
   an application program containing program instructions for applying a plurality of effects to digital images; and
   a digital camera including,
      an image device for capturing image data;
      a memory coupled to the imaging device for storing the image data as captured images,
      a display,
      a first set of navigation buttons having a first orientation,
      a second set of navigation buttons having a second orientation,
      multiple operating modes for supporting a plurality of digital imaging device functions, and
      a processor coupled to the image device, the memory, the display and to the first and second set of navigation buttons for controlling operation of the digital imaging device and the multiple operating modes wherein when the digital camera is placed into at least one of the operating modes, the processor displays the user interface of the digital camera by;
         displaying mode-specific items corresponding to that mode such that all of the mode-specific items are displayed in an alignment that is mapped to the orientation of the first set of navigation buttons,
         scrolling the mode-specific items in response to a user pressing the first set of navigation buttons wherein the display indicates which of the mode-specific items is a currently selected item, and wherein the mode-specific items are scrolled-off the display and replaced by new mode-specific items, and
         displaying additional information corresponding to the selected image in the display in a location that is offset from the active item in a direction of orientation corresponding to that of the second set of navigation buttons,
      wherein when the user selects one of the captured images and invokes the application program, the processor displays the user interface of the application program such that a user navigates both the operating modes and the application program in substantially the same manner by,
- automatically applying each one of the plurality of effects to the selected image to provide a plurality of real-time preview results,
- displaying the plurality of real-time preview results as a set of application specific items in the display such that all the application specific items are displayed in an alignment that is mapped to the orientation of first set of navigation buttons,
- scrolling the application-specific items in response to the user pressing first set of navigation buttons wherein the display indicates which of the application-specific items is a currently selected effect, and wherein the application specific items are scrolled-off the display and replaced by new application specific items,
- applying the selected effect to the selected image to create a large thumbnail, and
- displaying the large thumbnail in the display in a location that is offset from the aligned set of application-specific items in a direction of orientation corresponding to that of the second set of navigation buttons.

15. The system of claim 14 wherein the first set of navigation buttons have a horizontal orientation and the second set of navigation buttons have a vertical orientation.

16. The system of claim 15 wherein the preview results comprise thumbnail images.

17. The system of claim 16 wherein the means responsive to the application program being loaded into the digital imaging device further includes means to display a large thumbnail representing of the first captured image.

18. The system of claim 17 wherein the additional information displayed includes an identification of the effect applied to the first image.

* * * * *